(12) United States Patent
Farber et al.

(10) Patent No.: US 10,880,150 B1
(45) Date of Patent: Dec. 29, 2020

(54) NODE-INDEXED SYSTEM, APPARATUS AND METHOD CONFIGURED TO SEQUENCE CLIENT EVENTS WITHIN A PEER-TO-PEER NETWORK

(71) Applicants: Atlassian Pty Ltd, Sydney (AU); Atlassian, Inc., San Francisco, CA (US)

(72) Inventors: Jeffrey Lawrence Farber, San Mateo, CA (US); Max Robert Morton, Palo Alto, CA (US); Sidney Gee-Lake Shek, Sunnyvale, CA (US)

(73) Assignees: ATLASSIAN PTY LTD, Sydney (AU); ATLASSIAN, INC., San Francisco, CA (US)

( * ) Notice: Subject to any disclaimer, the term of this patent is extended or adjusted under 35 U.S.C. 154(b) by 0 days.

(21) Appl. No.: 16/861,153

(22) Filed: Apr. 28, 2020

Related U.S. Application Data

(60) Provisional application No. 63/003,065, filed on Mar. 31, 2020.

(51) Int. Cl.
  *H04L 12/24* (2006.01)
  *H04L 12/26* (2006.01)
  *H04L 29/08* (2006.01)

(52) U.S. Cl.
  CPC ...... *H04L 41/024* (2013.01); *H04L 29/08135* (2013.01); *H04L 41/028* (2013.01); *H04L 41/0246* (2013.01); *H04L 41/064* (2013.01); *H04L 41/0622* (2013.01); *H04L 41/0627* (2013.01); *H04L 43/06* (2013.01); *H04L 43/067* (2013.01); *H04L 43/0847* (2013.01); *H04L 43/106* (2013.01); *H04L 67/00* (2013.01)

(58) Field of Classification Search
  CPC ... H04L 9/3297; H04L 29/06823–0685; H04L 29/08135; H04L 41/0246; H04L 41/0273–0293; H04L 41/0604–064; H04L 43/06–067; H04L 43/0823; H04L 43/0847; H04L 43/106; H04L 67/00; H04L 67/30–306
  See application file for complete search history.

(56) References Cited

U.S. PATENT DOCUMENTS

| | | | |
|---|---|---|---|
| 2012/0066694 A1* | 3/2012 | Jennings | G06F 9/542 719/318 |
| 2013/0080348 A1* | 3/2013 | Pantaliano | H04H 60/66 705/347 |

* cited by examiner

*Primary Examiner* — Brendan Y Higa
(74) *Attorney, Agent, or Firm* — Alston & Bird LLP

(57) ABSTRACT

Systems, apparatus, and methods for tracking and sequencing client events in a federated computer network are discussed herein. Various embodiments provide a computer-implemented method for assigning timestamps to client events received by nodes within the network and appending node identifiers to the timestamps to create node time signatures for the client events to facilitate updating of a client event database. Still other embodiments provide methods for comparing a last event node time signature to a recently received node time signature and generating an updated node time signature in view of the same. Such embodiments address client event sequencing problems that tend to plague federated and distributed networks as they expand in scale, geographic distribution, complexity, and involve programmatic client event generating services such as credential management services.

23 Claims, 10 Drawing Sheets

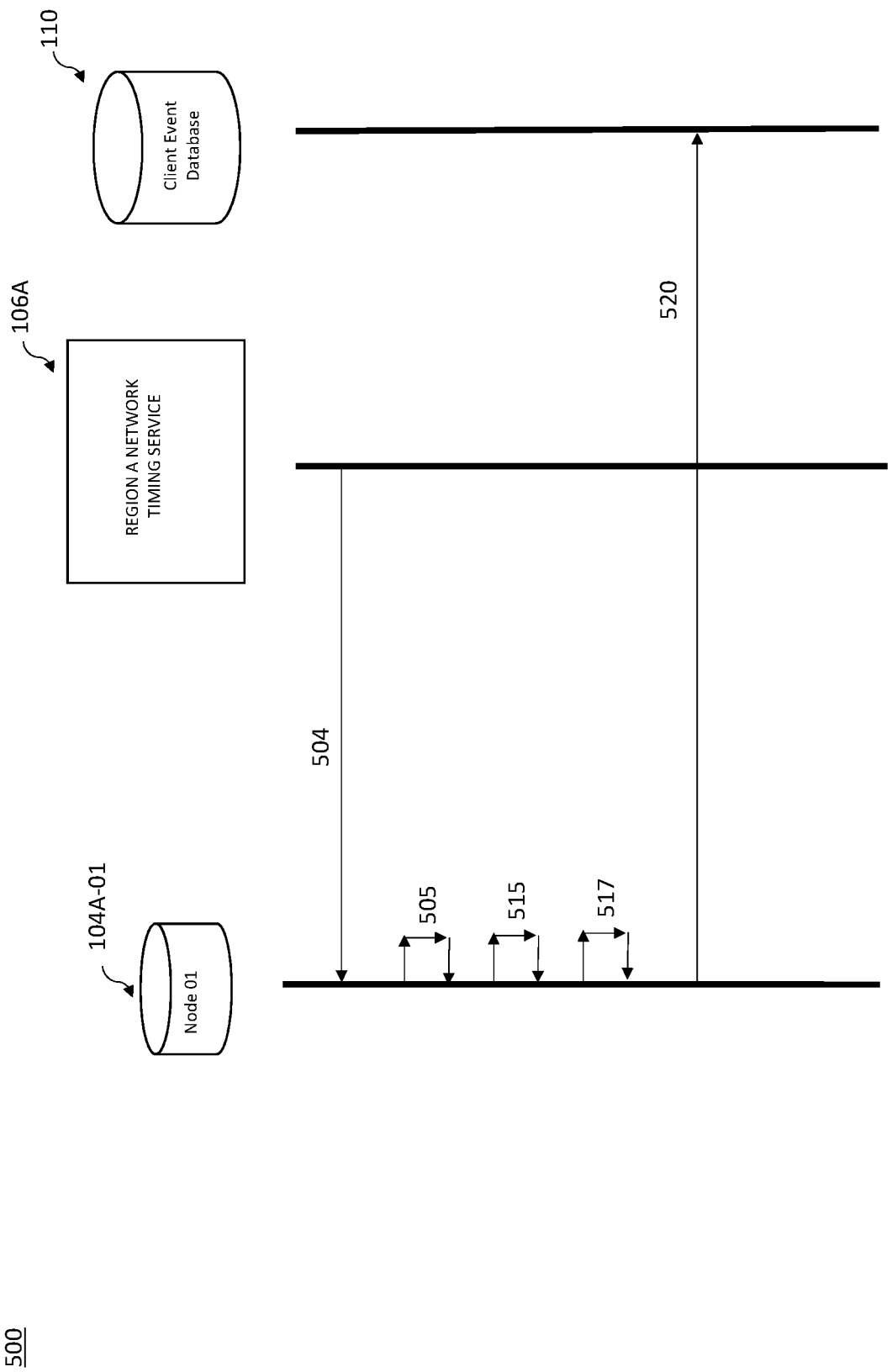

NODE-INDEXED SYSTEM, APPARATUS AND METHOD CONFIGURED TO SEQUENCE CLIENT EVENTS WITHIN A PEER-TO-PEER NETWORK

CROSS-REFERENCE TO RELATED APPLICATION

This application claims the benefit of U.S. Provisional Application No. 63/003,065, filed Mar. 31, 2020, which was entitled NODE-INDEXED SYSTEM, APPARATUS AND METHOD CONFIGURED TO SEQUENCE CLIENT EVENTS WITHIN A PEER-TO-PEER NETWORK. The entire contents of which is herein incorporated by reference in its entirety.

BACKGROUND

Federated computer networks are often supported by widely distributed servers and corresponding hardware resources. Such resources are configured to manage and support several distinct and autonomous software applications. Applicant has identified a number of deficiencies and problems associated with tracking and sequencing client events occurring within and among such federated computer networks. Through applied effort, ingenuity, and innovation, one or more of these deficiencies and problems have been solved by developing solutions that are included in embodiments of the present disclosure, various examples of which are described in detail herein.

SUMMARY

The appended claims serve as a summary of the disclosure.

BRIEF DESCRIPTION OF THE SEVERAL VIEWS OF THE DRAWINGS

Figure 1:
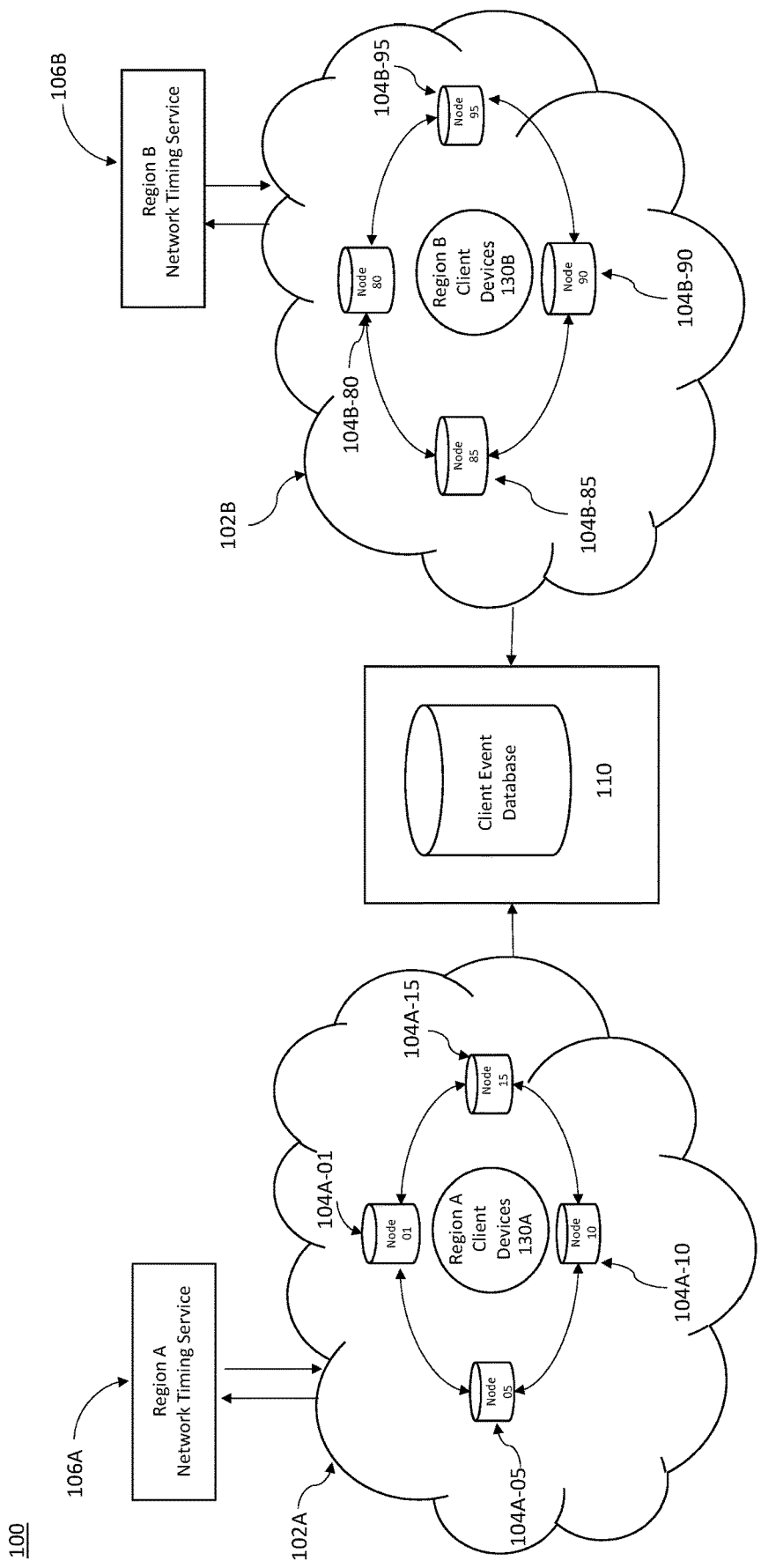
Figure 2:
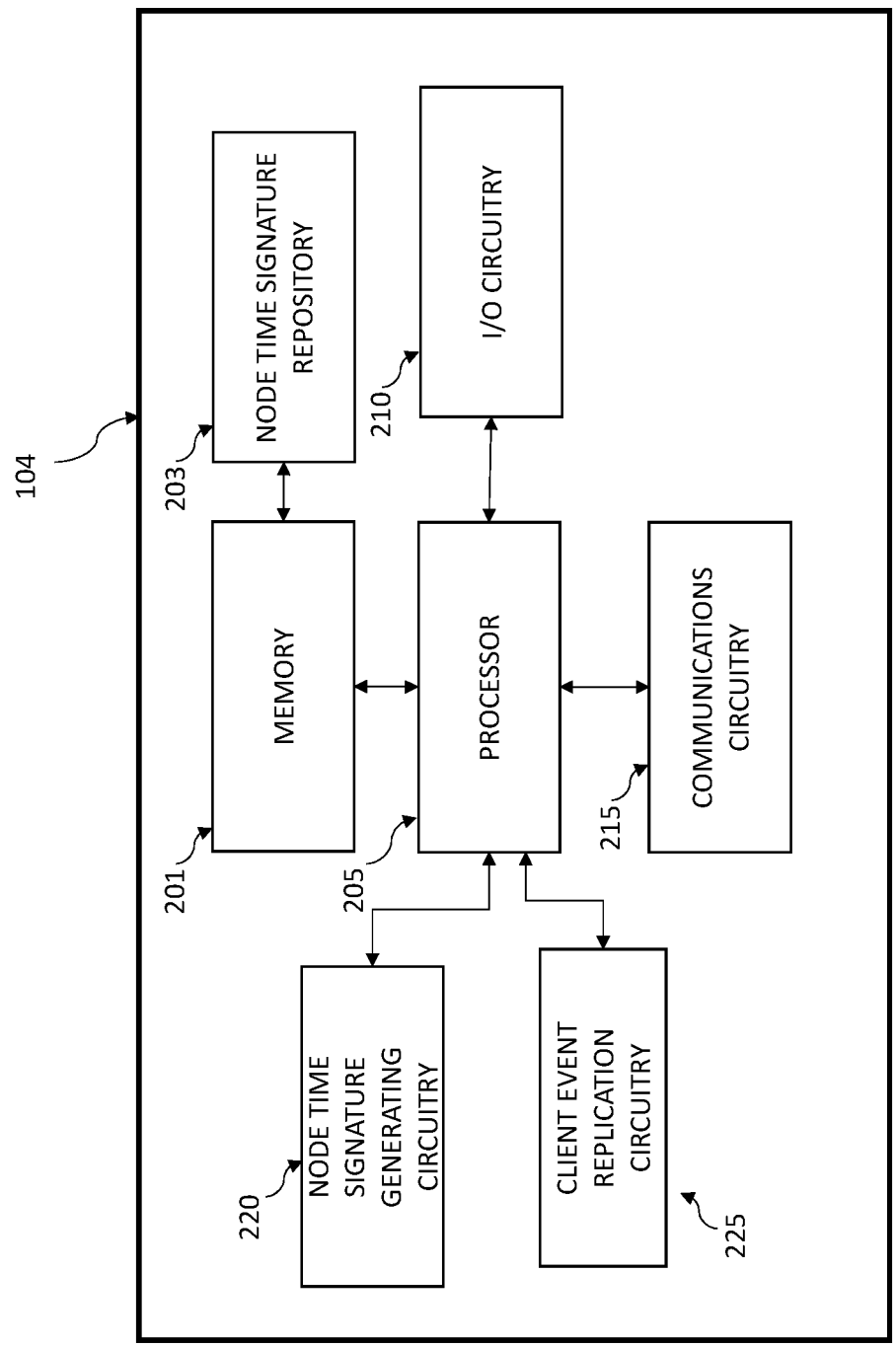
Figure 3:
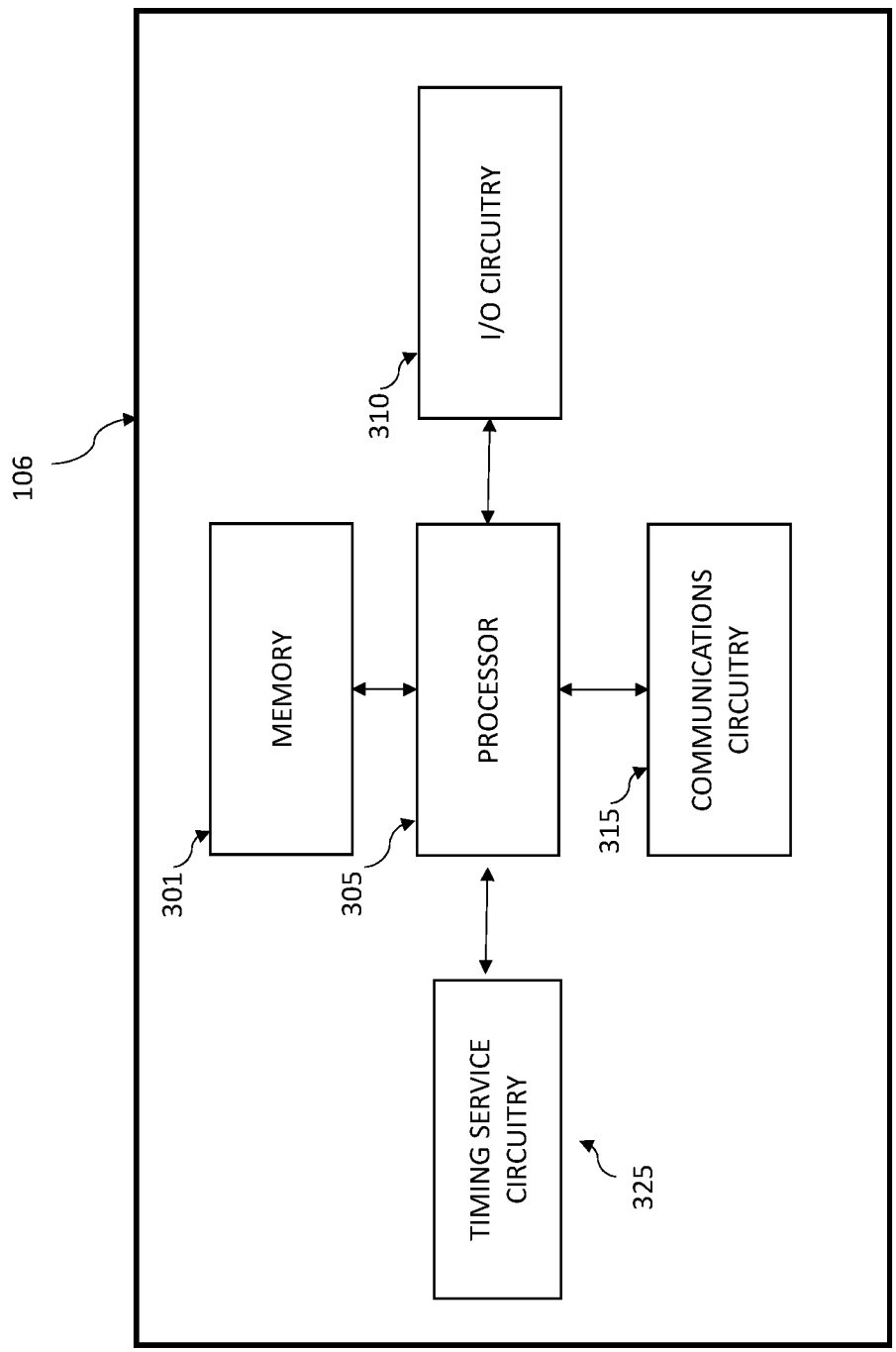
Figure 4:
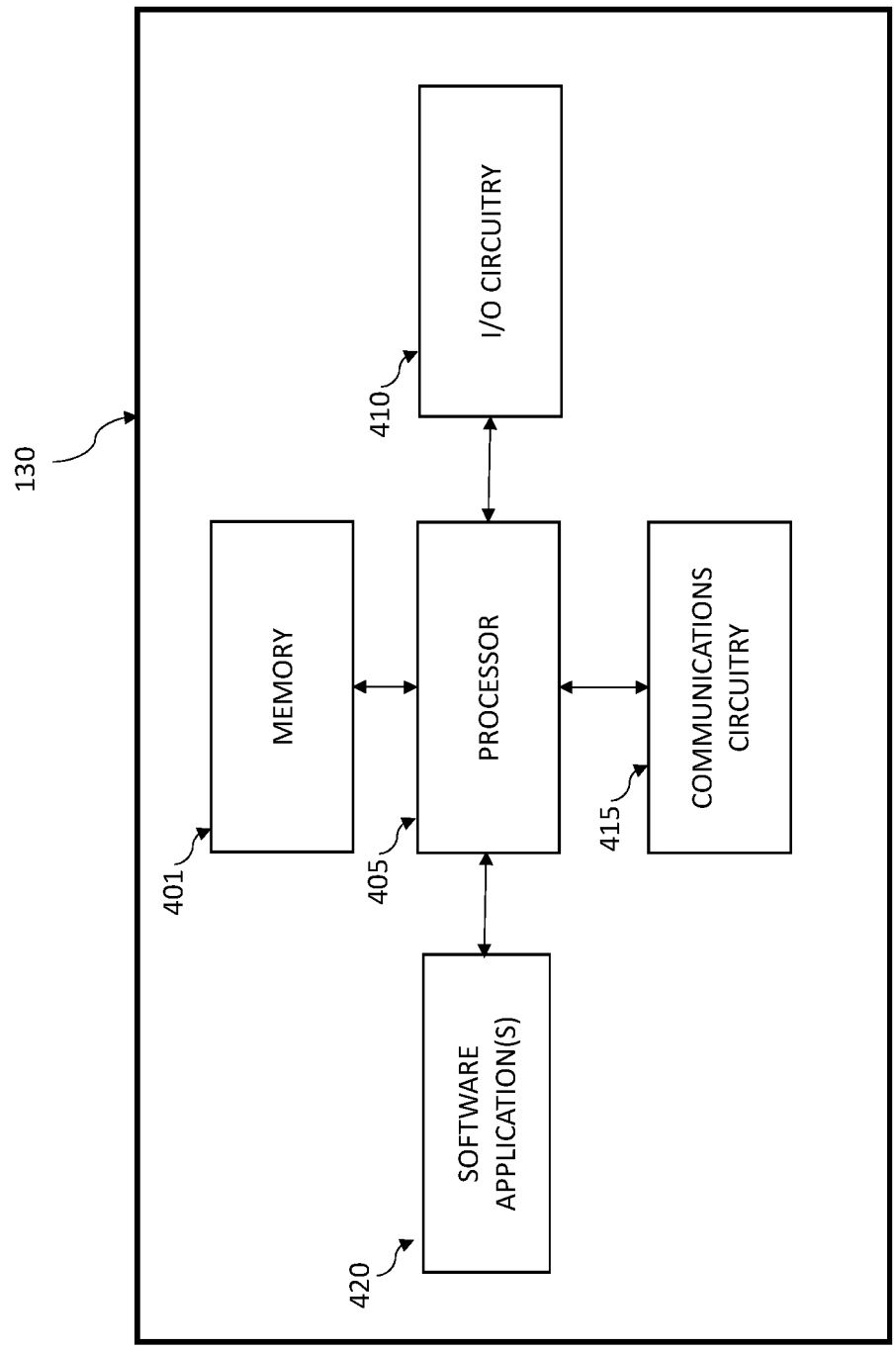
Figure 5A:
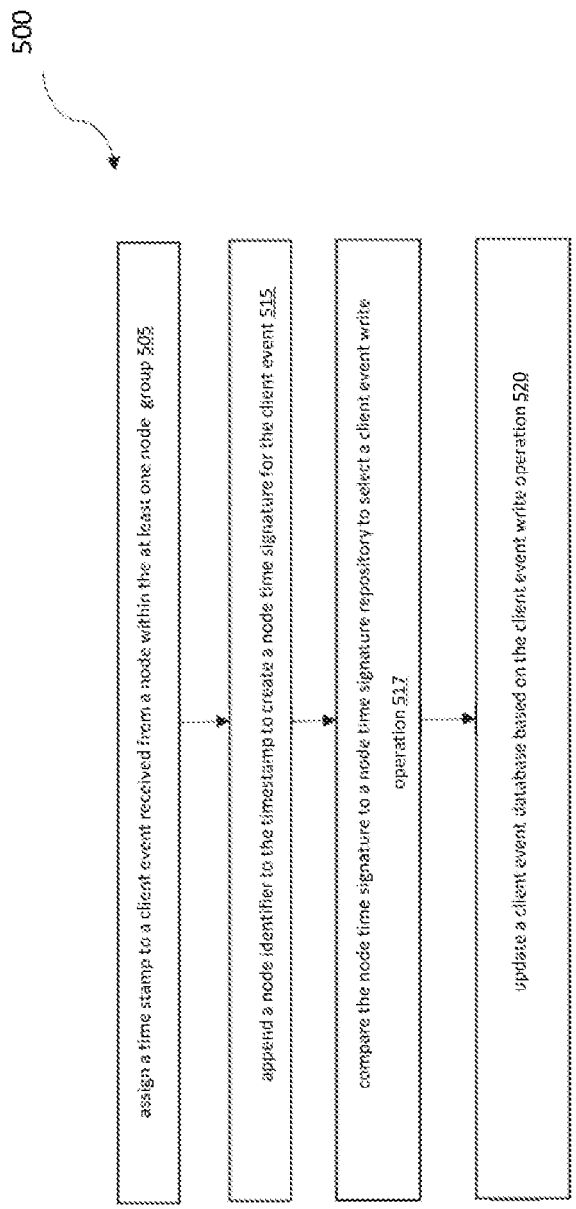
Figure 6A:
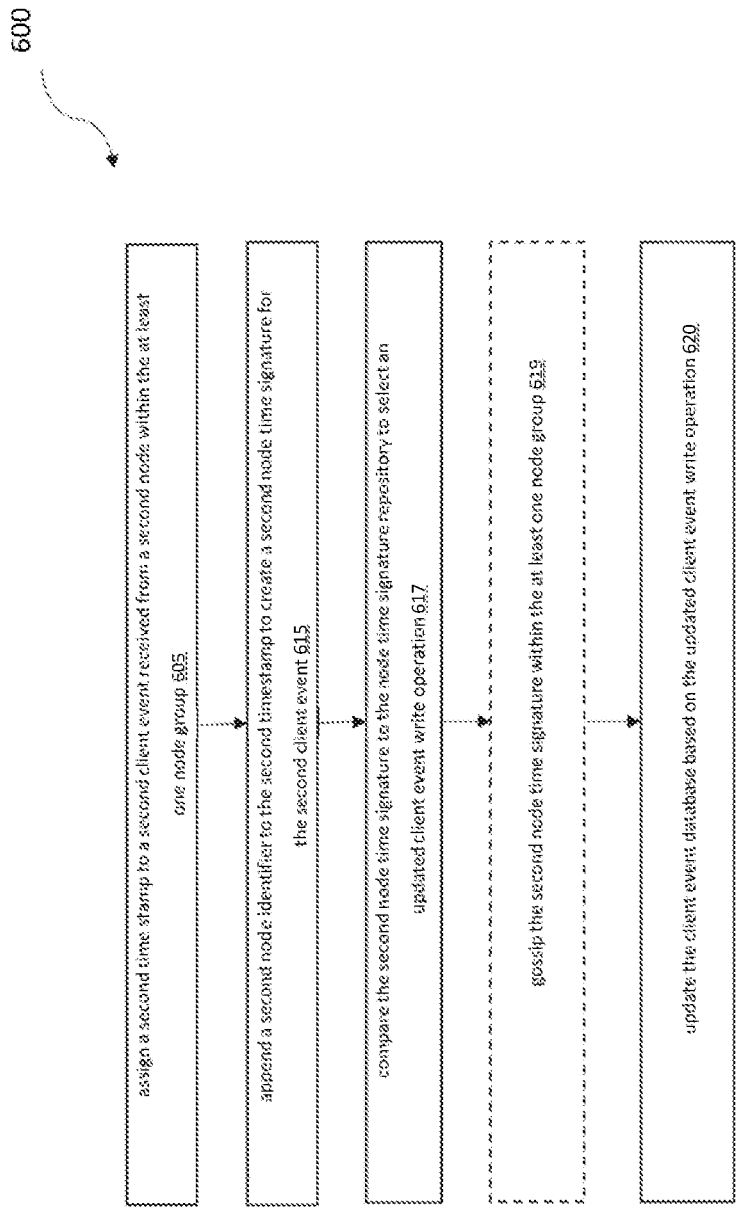
Figure 6B:
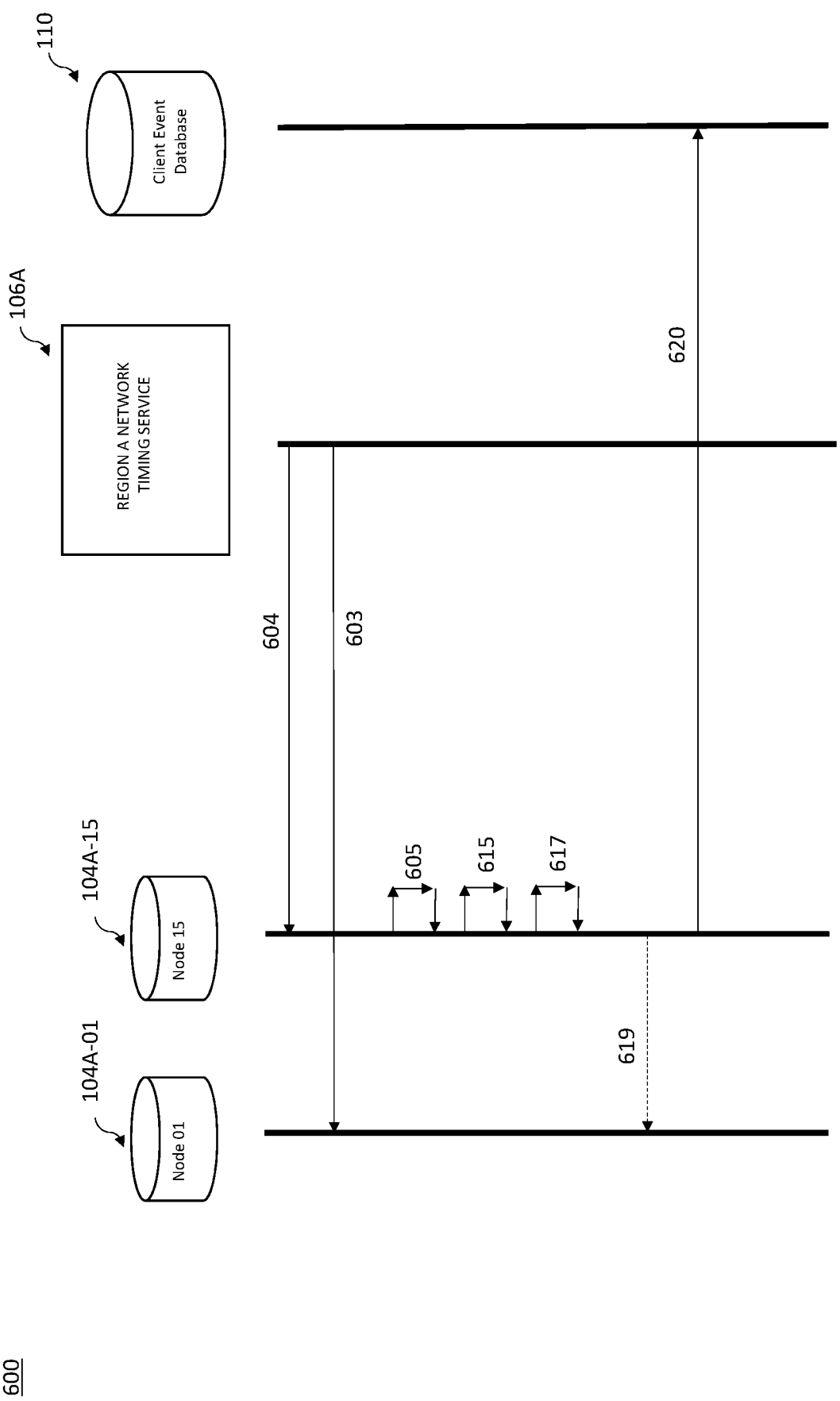
Figure 7:
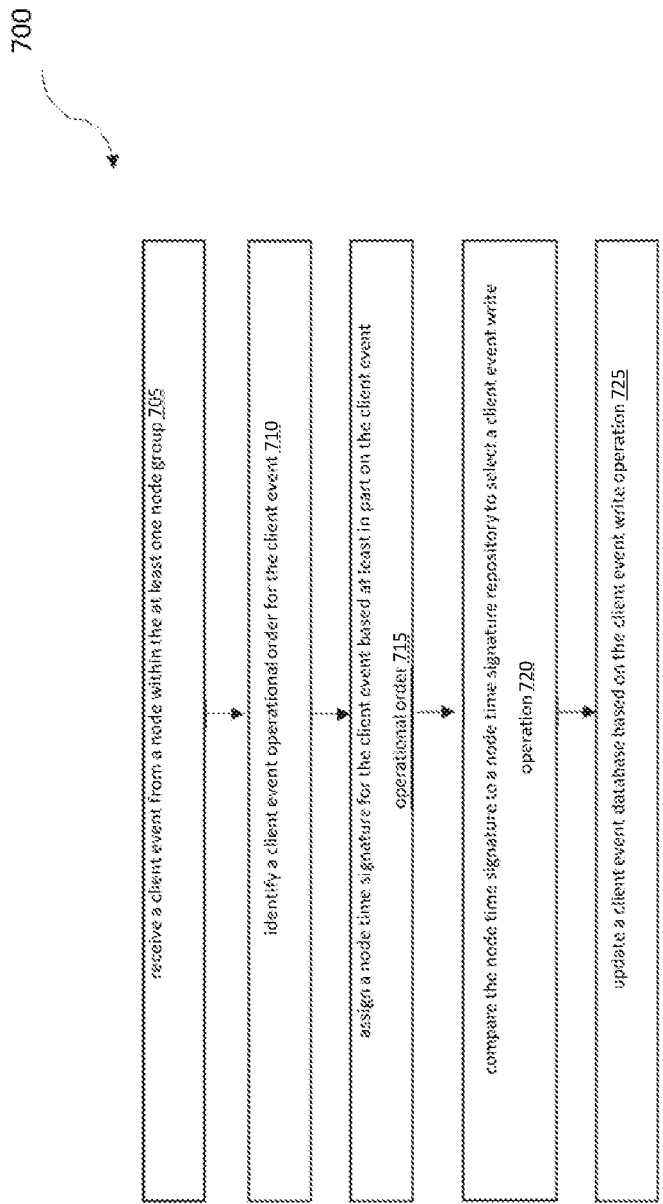
Figure 8:
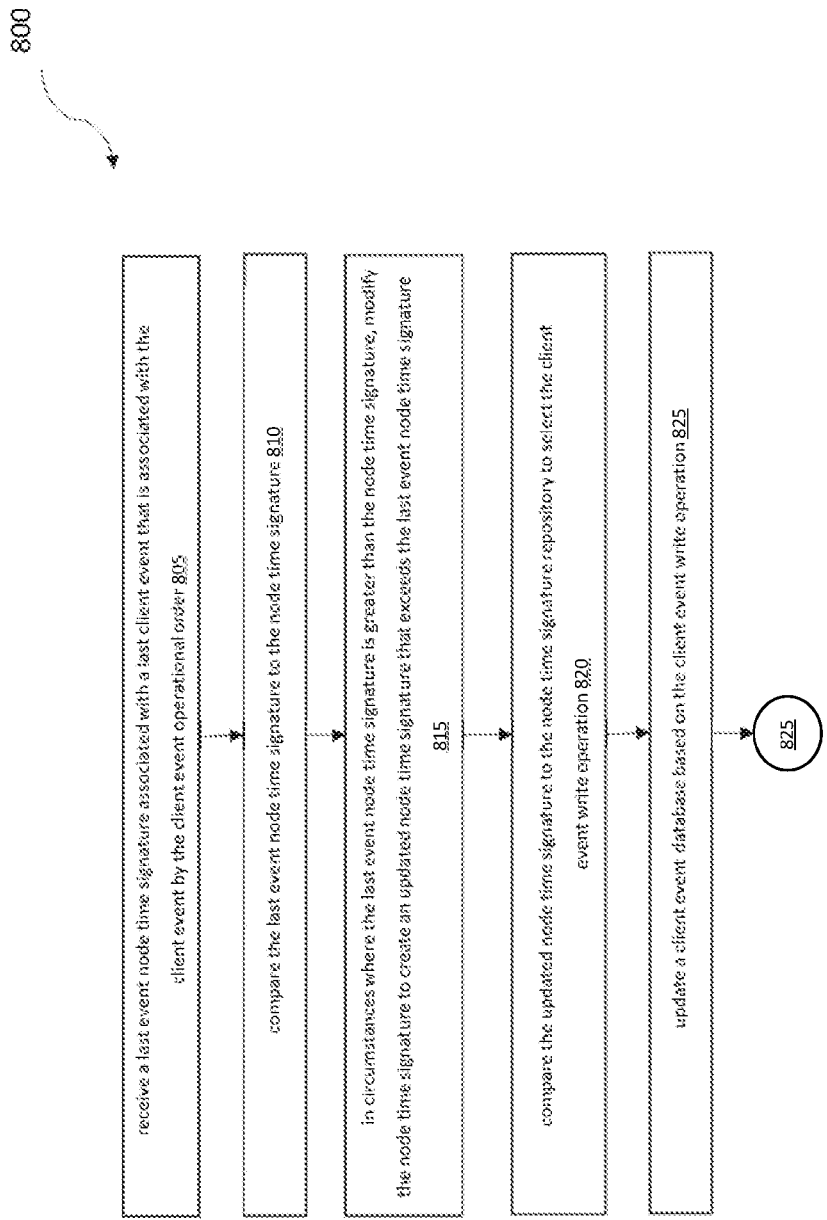

Having thus described some embodiments in general terms, reference will now be made to the accompanying drawings, which are not necessarily drawn to scale and wherein:

FIG. 1 is a system architecture diagram of a database platform architecture configured to practice embodiments of the present disclosure;

FIG. 2 is an exemplary schematic diagram of a node structured according to embodiments of the present disclosure;

FIG. 3 is an exemplary schematic diagram of a network timing service structured according to embodiments of the present disclosure;

FIG. 4 is an exemplary schematic diagram of a client device structured according to embodiments of the present disclosure;

FIG. 5A is a flowchart illustrating example operations for appending a node identifier to a timestamp to create a node time signature according to embodiments of the present disclosure;

FIG. 5B is an example signal diagram illustrating data flow operations for appending a node identifier to a timestamp to create a node time signature according to embodiments of the present disclosure;

FIG. 6A is a flowchart illustrating example operations for appending a second node identifier to a second timestamp to create a second node time signature associated with a second client event according to embodiments of the present disclosure;

FIG. 6B is an example signal diagram illustrating data flow operations for appending a second node identifier to a second timestamp to create a second node time signature associated with a second client event according to embodiments of the present disclosure;

FIG. 7 is a flowchart illustrating example operations for identifying a client event operational order for a received client event and assigning a node time signature for the client event based at least in part on the client event operational order according to embodiments of the present disclosure; and FIG. 8 is a flowchart illustrating example operations for comparing a last event node time signature to a newly received node time signature and modifying the newly received node time signature to create an updated node time signature according to embodiments of the present disclosure.

DETAILED DESCRIPTION

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Overview

Various embodiments of the invention generally relate to a federated network and database platform that supports multiple different software applications. Each of the software applications accommodates a plurality of user-based and application-based events that must be precisely tracked and managed. It is particularly difficult to ensure precise sequencing of such events as the federated database platform expands in scale to embody a peer-to-peer distributed system that is comprised of multiple geographically distributed regions of node groups (e.g., various distributed datacenters).

For example, consider a region A set in California that includes a node group A. An admin user, Mary, who works in California may authorize a new employee, Sara M. Johnson ("Sara"), for accessing a content collaboration software (e.g., Confluence® by Atlassian, Inc.). Thus, one or more nodes within node group A should receive an authorization event associated with Sara.

In some circumstances, two or more nodes within node group A may receive duplicate authorization events. For example, Mary may have temporary network connectivity issues and might issue two successive authorization events for Sara as she didn't perceive the first authorization event as going through. The first authorization event is received by node 01 of node group A while the second authorization event is received by node 15 of node group A. Given clock skew between the nodes and timestamp tolerancing, the system may perceive these authorization events for Sara as occurring at the exactly the same time thereby creating a potential conflict. In another example, a credential management service may mistakenly issue two simultaneous or near simultaneous duplicate authorization events for Sara creating a similar conflict but requiring less in the way of clock skew to present the issue.

Various embodiments discussed herein are configured to generate and append node time signatures to client events so that the federated database platform can efficiently and reliably sequence such events. In one embodiment, each received client event is assigned a timestamp by a receiving node. A node identifier is appended to the timestamp to create the node time signature for each client event and such node time signature is stored locally by the receiving node to a node time signature repository.

Each node within node Group A is also configured to transmit node time signatures for any received client event to other nodes within the group. Such node-to-node transmissions may be managed through a peer-to-peer protocol such as the "gossip protocol" used in NoSQL distributed databases running Apache Cassandra™.

Nodes are configured to compare received node time signatures to a local node time signature repository in order to select an appropriate client event write operation. For example, returning to the potential conflict created by Mary's duplicative and near simultaneous authorization events for Sara, let's consider for illustration purposes that Mary issued two authorization events each with a timestamp of 1234567. However, the two authorization events were received by different nodes (nodes 01 and 15). Thus, in one embodiment, node 01 is configured to append its node identifier to the timestamp received for the first authorization event to create a first node time signature (123456701), which is stored locally to a first node time signature repository. Node 15 is configured to append its node identifier to the timestamp received for the second authorization event to create a second node time signature (123456715), which is stored locally to a second node time signature repository.

In this example embodiment, nodes 01 and 15 are each configured to transmit the first and second node time signatures to other nodes in Group A through a gossip protocol. Each node in Group A is configured to determine a client event write operation for the received authorization events based on the received node time signatures. For example, in the present embodiment, each node in Group A is configured to identify that the magnitude of the first node time signature is less than the magnitude of the second node time signature (i.e., 123456701<123456715) and thereby determine that the authorization event received by node 15 is "last" (i.e., occurring later) for purposes of eventual client event database write operations.

In other example embodiments, nodes are configured to update node time signatures for received client events based on a client event operational order. For example, certain client events are known to occur before or after other client events. Authorization events, for example, are known to occur before revocation events (i.e., access to Confluence® cannot be revoked unless it was previously granted). This known client event operational order may be used to break ties between client events having simultaneous timestamps and may otherwise be used to properly contextualize received client events.

Returning to the above example involving Mary's duplicative authorization events, another admin user, Henry, may determine that Sara is not in fact entitled to certain user permissions and revoke her Confluence® access. Thus, one or more nodes within node group A may receive a revocation event for Sara.

Here, for example, Henry's revocation event is received by node 05 and issued a simultaneous timestamp of 1234567 due to clock skew and system tolerances. After distinguishing between Mary's duplicative authorization events using the process set forth above, node 05 had previously stored the node 15 received authorization event (i.e., node time signature 123456715) to its local node time signature repository for database write operations. Simple application of the node time signature process described above to the newly received revocation event produces a node time signature for the revocation event of 123456705.

However, given a known client event operation order for authorization/revocation client events, node 05 is configured in accordance with one embodiment to modify its node time signature for the revocation event to ensure that it is perceived as occurring after the most recent authorization event stored to its local time signature repository. In the present example, that means modifying the revocation event node time signature from 123456705 to 123456805 or some other node time signature value that is larger than its locally stored last event node time signature of 123456715.

Distributed database platforms structured in accordance with various embodiments are thus configured to properly sequence client events for eventual database write operations even in circumstances where such client events were actually received or are perceived to be received (i.e., due to clock skew, system tolerances, network interruption, etc.) to occur simultaneously or near simultaneously. Such functionality is particularly important as networks expand in scale, geographic distribution, complexity, and involve programmatic client event generating services such as credential management services.

Definitions

Certain terms used in connection with exemplary embodiments are defined below.

The term "client device" refers to computer hardware and/or software that is configured to access one or more services and/or software applications that are made available by a federated network and database platform. Client devices include, without limitation, smart phones, tablet computers, laptop computers, wearables, personal computers, enterprise computers, and the like. Client devices may execute a software application or "app" to interact with the federated network and database platform.

The terms "user profile" refers to data, files, and other information of a federated network and database platform that is associated with a user, including, for example, a user identifier, one or more software applications to which the user has been granted access, an avatar, an email address, a real name (e.g., Frank Smith), a username (e.g., fsmith), a password, a time zone, a status, and the like.

The term "client event" refers to a client device originating task, operation, job, action, or process that must be identified, tracked, properly sequenced, and stored by a federated network and database platform to promote proper functioning of one or more software applications supported by the federated network and database platform. Client events generally require database storage or write commands. One example client event is an "authorization event" in which an admin user operating an admin client device validates and authorizes a user for accessing a software application supported by the federated network and database platform. Such validation and authorization may culminate in the issuance of user access credentials as will be apparent to one of ordinary skill in the art in view of this disclosure.

Another example client event is a "revocation event" in which an admin user operating an admin client device removes a prior validation and authorization for a user to access a software application supported by the federated network and database platform. Such removal may culminate in the revocation of user access credentials as will be apparent to one or ordinary skill in the art in view of this disclosure.

The term "node" refers to computer hardware and/or software that is configured to send, receive, and/or forward communications between one or more client devices and other devices in a federated network and database platform. Each node in the federated network and database platform is assigned a unique "node identifier" comprised of American Standard Code for Information Interchange (ASCII) numbers or text. In one example, a node identifier is a numerical integer value that may be represented by 7 bits in a binary data format. Nodes are further configured to apply timestamps to received client events. Such timestamps may be determined based on a device clock local to the node or may be provided by a network timing service as defined below. In various embodiments, nodes are configured to append a node identifier to a timestamp for a particular client event to form a node time signature for the client event. Such node time signatures are stored by the node to a node time signature repository and are also communicated to other nodes in a particular datacenter, group, or cluster in accordance with a peer-to-peer communication protocol.

The term "node group" refers to a set, collection, or ring of nodes that are configured to receive and communicate similar data in peer-to-peer system such as the federated network and database platform. Collections of node groups may represent different datacenters as will be appreciated by one of ordinary skill in the art in view of this disclosure. Each datacenter uses communications occurring between the nodes and node groups, which are managed by peer-to-peer communication protocols, to coordinate datacenter workloads.

The term "network timing service" refers to computer hardware and/or software that is configured to provide time reference for the federated network and database platform. In some embodiments, the network timing service is configured for determining both wall time and monotonic time, calibrating node and other device clocks with the federated network and database platform, generating timestamps associated with client events, and resolving timestamps and node clock accuracy to millisecond precision. In some embodiments, timing service workloads for the federated network and database platform may be distributed among regional network timing services with each regional network timing service being responsible for a particular datacenter or node group. In other embodiments, a single network timing service may be configured to handle the entire workload for the federated network and database platform.

The term "client event database" refers to computing location, such as a memory device, where data is stored, accessed, modified and otherwise maintained by the federated network and database platform. The stored data includes information that facilitates the operation of the federated network and database platform including a log or registry of client events. The client event database may be embodied as a data storage device or devices, as a separate database server or servers, or as a combination of data storage devices and separate database servers. The client event database may be a dedicated device and/or a part of a larger repository.

The term "client event operational order" refers to a set of rules or policies for determining the precedence of client events received within the federated network and database platform. The client event operational order establishes the expected chronology of client events based on client event type. For example, the client event operational order for a received authorization event would dictate that it most likely occurred before any revocation event (i.e., a last client event) as one cannot revoke what one has not previously authorized.

The term "last client event" refers to the most recent client event associated with a particular client type and/or a particular client event identifier. Nodes configured in accordance with various embodiments discussed herein work out relationships between a newly received client event and a last client event by reference to a client event operational order. In some embodiments, a last client event and a newly received client event may have an opposite, reciprocal, or sequential relationship based on the client event operational order. Returning to our example of Mary and Henry, Mary's second authorization event is a last client event as to Henry's revocation event. Moreover, these two client events have opposite client event types and a sequential operational order. Therefore, Mary's second authorization event is a last client event as to Henry's revocation event, and the two events are sequenced by the client event operational order.

The term "client event write operation" refers to a task or command and associated instructions for storing a particular client event to a client event database. In various embodiments, client event write operations are defined by nodes upon comparing node time signatures for received client events to local node time signature repositories. In one embodiment, a client event write operation comprises a task or command for storing a single client event to the client event database. However, in other embodiments, defining a client event write operation involves determining a series or sequence of client events for storing to the client event database.

Example System Architecture

FIG. 1 is a system architecture diagram of a federated network and database platform 100 ("the database platform") configured to practice embodiments of the present disclosure. The depicted database platform 100 is a peer-to-peer network that is configured to host, support, and manage various distinct and self-directed software applications. The database platform 100 is geographically distributed and, thus, supports multiple regional networks 102A, 102B. Each regional network (e.g., Region A, Region B, etc.) includes one or more node groups that are configured to communicate with a plurality of regionally located client devices. For example, depicted regional network 102A includes node group 104A (i.e., nodes 01, 05, 10, 15) and regionally located client devices 130A. The depicted regional network 102B includes node group 104B (i.e., nodes 80, 85, 90, 95) and regionally located client devices 130B.

Each regional network 102A, 102B is supported by a regional network timing service 106A, 106B. The depicted regional network timing services form part of a network timing service, which is a time reference service that is configured to provide current time data according to a Coordinated Universal Time (UTC) global standard. The depicted network timing service partitions its timing service tasks or workloads between equally privileged members (e.g., regional timing services 106A, 106B) of the database platform 100. In some embodiments, timing service tasks or workloads comprise updating or calibrating node and other device clocks within the federated network and database platform 100. For example, timing services 106A, 106B are configured to calibrate node clocks within depicted regional networks 102A, 102B at regular defined internals.

Client devices access a network timing service over an appropriately local network. Thus, for example, client devices 130A located in Region A access network timing service 106A over regional network 102A. Client devices 130B located in Region B access network timing service 106B over regional network 102B. Regional networks 102A, 102B may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, regional networks 102A, 102B may include a cellular telephone, an 802.11, 802.16, 802.20, and/or WiMax network. Further, regional networks 102A, 102B may include a public network, such as the Internet, a private network, such as an intranet, or combinations thereof, and may utilize a variety of networking protocols now available or later developed including, but not limited to TCP/IP based networking protocols. In embodiments, a network timing service may be accessed, for example, using standard Network Time Protocol (NTP) clients over a virtual IP.

Embodiments of the present disclosure may configure the regional networks 102A, 102B within structured peer-to-peer networks, having specific topologies and protocols so as to facilitate ease of scalability and reliability. For example, geographically distributed regional networks 102A, 102B may be configured within substantially ring-shaped network topologies employing key-value storage protocols. Thus, as illustrated in FIG. 1, Region A network timing service 106A and Region B network timing service 106B may each be configured to provide timing services (e.g., device clock calibration services) to substantially ring-shaped regional networks 102A, 102B, respectively.

Regional networks 102A, 102B may each be configured as decentralized networks. Regional networks 102A, 102B may each comprise a plurality of nodes related to and configured with one another as to data type being stored, thereby defining a node group. Moreover, regional networks 102A, 102B may further comprise groups of nodes related to and configured with one another as to data replication, thereby defining one or more datacenters. Each node of a node group may function equally and identically. Thus, the integrity of each regional network 102A, 102B may be ensured, because no individual node is a potential point of failure.

Federated network and database platforms according to embodiments of the present disclosure are structured as peer-to-peer networks configured to facilitate the addition or removal of nodes without significant impact. For example, nodes within a federated network and database platform may be configured as virtual nodes.

Each node 104A, 104B depicted within regional networks 102A, 102B may be configured as a primary replica for a portion of the data stored within such regional networks 102A, 102B. For example, a partitioner (e.g., a hash function) may be configured to assign equal portions of data to each node and evenly distribute data throughout the node group. A partitioner may be a non-cryptographic hash function configured for performance on large data sets with low collision rate (e.g., MurMurHash3). Copies of data may be maintained on other nodes or "replicas" within the node group. Thus, replicas within the ring may be configured to facilitate data read and write operations in the stead of a failed node. Therefore, embodiments of the present disclosure overcome scalability limits attendant to the hardware interconnection complexity and geographic proximity requirements of centralized systems (e.g., systems employing master-slave replication).

The depicted node groups 104A, 104B are configured to employ a gossip protocol for communication with one another. For example, a gossip protocol may be employed for intra-group and inter-group communication. Thus, peer-to-peer systems structured in accordance with embodiments of the present disclosure are configured so that each node has state information about each other node. For example, a gossipee node may be configured to respond to a gossiper node with not only state information about itself, but also with information about those other nodes with which it has communicated.

In embodiments, state information may be versioned key/value stores. Thus, nodes configured according to embodiments of the present disclosure may employ a gossip protocol to not only send out state information, but to also exchange state information so that gossiper node and gossipee node have the same state. Nodes of peer-to-peer systems structured in accordance with embodiments of the present disclosure further may be configured to initiate a gossip protocol with a specific frequency. For example, a gossip protocol may be initiated every 1 s, every 5 s, every 10 s, every 1 hour, or any other suitable frequency.

Peer-to-peer systems structured in accordance with embodiments of the present disclosure may configure nodes to reference a unique node identifier. For example, nodes 104A of regional network 102A may be assigned node identifiers 01, 05, 10, and 15 while nodes 104B of regional network 102B may be assigned node identifiers 80, 85, 90, and 95. Other node groups (not shown) may be added to the network with differing node identifier range sets as will be apparent to one of ordinary skill in the art in view of this disclosure.

Client devices may connect to any node in a node group to communicate client events. For example, client devices 130A may connect to any of nodes 104A-01 through 104A-15 depicted within regional network 102A of FIG. 1. Similarly, client devices 130B may connect to any of nodes 104B-80 through 104B-95 depicted within regional network 102B.

Embodiments of the present disclosure may be configured, in some examples, to direct a particular node to act as a coordinator node to manage tasks among the nodes of a given node group. For purposes of illustration, if a client device 130A connects to node 104A-01 to write particular data associated with a client event, that node 104A-01 may act as a coordinator node to manage such write request through the entire write path including issuing a response back to originating client device 130A. Thus, a coordinator node may act as a proxy for managing a client event.

State information passed between nodes in connection with the above referenced gossip protocol may include, for example, client event data, associated node time signature data, timestamp data, and last event node time signature data for a particular client event. A coordinator node (i.e., client event replication circuitry) may thus be configured to retrieve or otherwise access and replicate such client events, including associated node time signatures, and last event node time signatures. In some embodiments, coordinator nodes may be configured to communicate with network timing services 106A, 106B to calibrate device clocks that are used to generate client event timestamps. Such timestamps are used to generate node time signatures for associated client events as discussed in greater detail below.

In some embodiments, client events, associated node time signatures, and last event node time signatures for particular client events are stored to a node time signature repository. For example, client events, associated node time signatures, and last event node time signatures for particular client events originating from client devices 130A are stored to a local memory (e.g., memory 201 and/or node time signature repository 203 of FIG. 2) of a node that receives the client events. Such client event data may then be gossiped to other nodes within regional network 102A. In such circumstances, the collective local memories of the nodes of regional network 102A may be referred to herein as a local node time signature repository. In other embodiments, a memory device or repository that is separate from the local memory of any particular node or group of nodes may be used as a node time signature repository.

The client event database 110 may be embodied as data storage devices such as a Network Attached Storage (NAS) device, or as separate database servers. The client event database 110 includes information accessed and stored by the node groups 104A, 104B to facilitate operations of the database platform 100. For example, the client event database 110 may fetch and aggregate data files pertaining to client events and associated node time signatures over regional networks 102A and 102B.

Exemplary Apparatus for Implementing Embodiments of the Present Disclosure Exemplary Node FIG. 2 illustrates an exemplary node 200 configured according to various embodiments of the present disclosure. For example, any node of node group 104A or 104B may be embodied as the exemplary node 200 shown in FIG. 2. Node 200 includes memory 201, processor 205, input/output ("I/O") circuitry 210, communications circuitry 215, node time signature generating circuitry 220, and client event replication circuitry 225.

In some embodiments, the processor 205 (and/or co-processor or any other processing circuitry assisting or otherwise associated with the processor) may be in communication with the memory 201 via a bus for passing information among components of the node 200. The memory 201 may be non-transitory and may include, for example, one or more volatile and/or non-volatile memories. In other words, for example, the memory may be an electronic storage device (e.g., a computer readable storage medium). The memory 201 may be configured to store information, data, content, applications, instructions, or the like, for enabling the node 200 to carry out various functions in accordance with example embodiments of the present disclosure.

In one example, the memory 201 is configured to serve as a local cache for client events, associated node time signatures, and last event node time signatures. In this regard, memory 201 is configured as a local node-time signature repository. In other embodiments, memory 201 may be configured to communicate with one or more other memory devices, which serve as node time signature repository 203 as shown.

The processor 205 may be embodied in a number of different ways and may, for example, include one or more processing devices configured to perform independently. Additionally, or alternatively, the processor 205 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 205 may be configured to execute instructions stored in the memory 201 or otherwise accessible to the processor 205. Alternatively, or additionally, the processor 205 may be configured to execute hard-coded functionality. As such, whether configured by hardware or software methods, or by a combination thereof, the processor 205 may represent an entity (e.g., physically embodied in circuitry) capable of performing operations according to an embodiment of the present disclosure while configured accordingly. Alternatively, as another example, when the processor 205 is embodied as an executor of software instructions, the instructions may specifically configure the processor 205 to perform the algorithms and/or operations described herein when the instructions are executed.

The depicted node 200 includes input/output circuitry 210 that may, in turn, be disposed in communication with processor 205 to provide output to another node 200, to the client device and, in some embodiments, to receive an indication of a client input. In some embodiments, input/output circuitry 210 is configured to receive various client events associated with client devices that are generated within the federated network and database platform. The input/output circuitry 210 may comprise a user interface and may include a display and may comprise a web user interface, a mobile application, a client device, or the like. In some embodiments, the input/output circuitry 210 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 201, and/or the like).

The communications circuitry 215 may be any means such as a device or circuitry embodied in either hardware or a combination of hardware and software that is configured to receive and/or transmit data from/to a network and/or any other device, circuitry, or module in communication with the node 200. In this regard, the communications circuitry 215 may include, for example, a network interface for enabling communications with a wired or wireless communication network. For example, the communications circuitry 215 may include one or more network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s).

Client event replication circuitry 225 is configured to employ a "gossip" or other peer-to-peer communication protocol to disseminate state information (e.g., client events, associated node time signatures, and last event node time signatures, etc.) among nodes within the federated network and database platform. Moreover, client event replication circuitry 225 is configured to employ suitable replication strategies governing a predetermined replication factor. For example, a replication factor may determine the total number of replicas employed in the various node groups of the database platform. Systems structured according to the present embodiment may be configured so that the replication factor does not exceed the total number of nodes throughout the database platform.

Node time signature generating circuitry 220 is configured to create node time signatures for client events. Therefore, in the depicted embodiment, the node time signature generating circuitry 220 is configured to communicate with a network timing service 106A, 106B (as shown in FIG. 1) to periodically calibrate its node device clock or other similar components that are used to generate timestamps for received client events and to append node identifiers to such timestamps. In one embodiment, the node time signature generating circuitry 220 receives calibration updates periodically from the network timing services 106A, 106B. In other embodiments, node time signature generating circuitry 220 may be configured to dispatch time calibration requests to network timing service 106A, 106B.

In the depicted embodiment, the node time signature generating circuitry 220 is configured to generate timestamps for each received client event. The depicted node time signature generating circuitry 220 is further configured to append a node identifier to such timestamps to generate a node time signature as discussed in greater detail herein.

The depicted node time signature generating circuitry 220 is further configured to determine client event write operations to support database writes. For example, node time signature generating circuitry 220 is configured to compare node time signatures to determine which client event to write to client event database 110.

The node time signature generating circuitry 220 may be any means such as a device or circuitry combined in either hardware or a combination of hardware and software that is configured to receive client events, obtain and/or assign timestamps, and append node identifiers to create node time signatures. In some embodiments, node time signature generating circuitry 220 is further configured to identify last event node time signatures associated with a client event and to modify a received node time signature to create an updated node time signature as discussed in greater detail below.

In some embodiments, the node time signature generating circuitry 220 is configured to append a node identifier to a timestamp so that the node identifier replaces the least significant digits of the timestamp. For example, a node time signature may comprise: (i) a sign bit; (ii) a timestamp in milliseconds; and (iii) a unique node identifier. In one example, a node time signature may be a 64-bit signed integer. Such node time signature may therefore comprise, for example, a 10-bit node identifier. In still another example, a node time signature may be generated via a NoSQL database command similar to the following:

```
package handlersV2
import (
"encoding json"
"fmt"
"net http"
"time"
"github.com beevuk ntp"
)
const                                updateInterval
    time.Duration=144*time.Millisecond
const maxUniqueID int64=1000
const ntpHost string "169.254.169.123"
type TokenHandler interface {
GenerateToken(http.ResponseWriter, *http.Request)
}
func NewTokenHandler(uniqueId int64) TokenHandler {
h:&tokenHandler (=uniqueId, timeNow( )}
go h.asyncUpdateAwsTime( )
return h
}
type tokenHandler struct {
```

Exemplary Network Timing Service

FIG. 3 illustrates an exemplary network timing service 300 configured according to various embodiments of the present disclosure. For example, either or both of regional network timing service 106A, 106B of FIG. 1 may be embodied as the exemplary timing service 300 shown in FIG. 3.

Exemplary network timing service 300 comprises a processor 305, a memory 301, communications circuitry 315, input/output ("I/O") circuitry 310, and timing service circuitry 325. In various embodiments, the processor 305 is disposed in communication with node time signature generating circuitry 220 and client event replication circuitry 225 depicted in FIG. 2.

In some embodiments, the processor 305 (and/or co-processor or any other processing circuitry assisting or otherwise associated with the processor) may be in communication with the memory 301 via a bus for passing information among components of the network timing service 300. The memory 301 may be non-transitory and may include, for example, one or more volatile and/or non-volatile memories. In other words, for example, the memory may be an electronic storage device (e.g., a computer readable storage medium). The memory 301 may be configured to store information, data, content, applications, instructions, or the like, for enabling the network timing service 300 to carry out various functions in accordance with example embodiments of the present disclosure.

The processor 305 may be embodied in a number of different ways and may, for example, include one or more processing devices configured to perform independently. Additionally, or alternatively, the processor 305 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 305 may be configured to execute instructions stored in the memory 301 or otherwise accessible to the processor 305. Alternatively, or additionally, the processor 305 may be configured to execute hard-coded functionality. As such, whether configured by hardware or software methods, or by a combination thereof, the processor 305 may represent an entity (e.g., physically embodied in circuitry) capable of performing operations according to an embodiment of the present disclosure while configured accordingly. Alternatively, as another example, when the processor 305 is embodied as an executor of software instructions, the instructions may specifically configure the processor 305 to perform the algorithms and/or operations described herein when the instructions are executed.

The depicted network timing service 300 includes input/output circuitry 310 that may, in turn, be in communication with processor 305 to provide output to the client and, in some embodiments, to receive an indication of a client input. The input/output circuitry 310 may comprise a user interface and may include a display and may comprise a web user interface, a mobile application, a client device, or the like. In some embodiments, the input/output circuitry 310 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 301, and/or the like).

The communications circuitry 315 may be any means such as a device or circuitry embodied in either hardware or a combination of hardware and software that is configured to receive and/or transmit data from/to a network and/or any other device, circuitry, or module in communication with the network timing service 300. For example, communications circuitry is configured to receive and/or transmit data from/ to nodes of regional networks 102A, 102B. Communications circuitry 315 may include, for example, a network interface for enabling communications with a wired or wireless communication network. For example, the communications circuitry 315 may include one or more network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s).

Timing service circuitry 325 is configured to calibrate node and other device clocks within a node group or the federated network and database platform more generally. In some embodiments, timing service circuitry 325 is configured to generate a wall clock time every update interval (e.g., 100 ms, 75 ms, 50 ms). For example, time may be measured by the timing service circuitry in milliseconds from a custom epoch. In one embodiment, timing service circuitry 325 is further configured to generate a monotonic clock time (i.e., the elapsed time between a current wall clock time and the last generated wall clock time). In another embodiment, timing service circuitry 325 is further configured to combine a wall clock time and a monotonic time to generate timing data and/or device clock updates. In still other embodiments, other device clock calibration methods or logical processes may be used.

Exemplary Client Device

FIG. 4 is an exemplary schematic diagram of a client device 400 structured according to embodiments of the present disclosure. Region A client devices 130A and Region B client devices 130B of FIG. 1 may be embodied by one or more computing devices, such as client device 400 depicted in FIG. 4. The depicted client device 400 includes a memory 401, a processor 405, input/output ("I/O") circuitry 410, communications circuitry 415, and one or more software applications 420 supported by the federated network and database platform.

In some embodiments, the processor 405 (and/or coprocessor or any other processing circuitry assisting or otherwise associated with the processor) may be in communication with the memory 401 via a bus for passing information among components of the client device 400. The memory 401 may be non-transitory and may include, for example, one or more volatile and/or non-volatile memories. In other words, for example, the memory may be an electronic storage device (e.g., a computer readable storage medium). The memory 401 may be configured to store information, data, content, applications, instructions, or the like, for enabling the client device 400 to carry out various functions in accordance with example embodiments of the present disclosure.

The processor 405 may be embodied in a number of different ways and may, for example, include one or more processing devices configured to perform independently. Additionally, or alternatively, the processor 405 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 405 may be configured to execute instructions stored in the memory 401 or otherwise accessible to the processor. Alternatively, or additionally, the processor 405 may be configured to execute hard-coded functionality. As such, whether configured by hardware or software methods, or by a combination thereof, the processor 405 may represent an entity (e.g., physically embodied in circuitry) capable of performing operations according to an embodiment of the present disclosure while configured accordingly. Alternatively, as another example, when the processor 405 is embodied as an executor of software instructions, the instructions may specifically configure the processor 405 to perform the algorithms and/or operations described herein when the instructions are executed.

The communications circuitry 415 may be any means such as a device or circuitry embodied in either hardware or a combination of hardware and software that is configured to receive and/or transmit data from/to a network and/or any other device, circuitry, or module in communication with the client device 400. In this regard, the communications circuitry 415 may include, for example, a network interface for enabling communications with a wired or wireless communication network. For example, the communications circuitry 415 may include one or more network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s).

In some example embodiments where a client device 400 is a mobile device, such as a smartphone or tablet, the client device 400 may execute a software application 420 supported by the federated network and database platform to interact with regional networks 102A, 102B (shown in FIG. 1). Such software application or "apps" are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally, or alternatively, the client device 400 may interact with the regional networks 102A, 102B via a web browser. As yet another example, the client device 400 may include various hardware or firmware designed to interface with the regional networks 102A, 102B.

In the depicted embodiment, the client device 400 is configured, via the processor 405 and using data and instructions provided by the software application 420, to generate one or more client events for transmission to one or more nodes of the regional networks 102A, 102B shown in FIG. 1. For example, client device 400 may be an admin device that is configured to issue authorization events and revocation events associated with a particular software application (e.g., Confluence®).

Exemplary Operations

Having described the group-based communication apparatus and exemplary circuitry comprising embodiments of the present disclosure, it should be understood that the network timing services 106A, 106B along with node group 104A and node group 104B (shown in FIG. 1) may proceed to implement various embodiments of the present invention within a federated network and database platform in a number of ways.

FIG. 5A is a flowchart illustrating example operations for assigning a timestamp to a client event received from a node within the at least one node group, providing the timestamp for creation of a node time signature for the client event, appending a node identifier to the timestamp to create a node time signature for the client event, comparing the node time signature to a node time signature repository to define a client event write operation, and updating a client event database based on the client event write operation. As will be appreciated by one of ordinary skill in the art in view of this disclosure, the operations described below occur in the context of various client devices generating one or more client events. Returning to the example discussed at the Overview above, an example client event might be an authorization event issued by admin user Mary for provisioning Confluence® access for new user Sara.

In the embodiment illustrated in FIG. 5A, the depicted process 500 begins at Block 505, which includes assigning a timestamp to a client event received at a node within at least one node group. In one embodiment, the timestamp is generated and assigned to the client event by node time signature generating circuitry of the receiving node. In other embodiments, other node circuitries may be used to generate the timestamp, which is then passed to the node time generating circuitry for associating to a received client.

At Block 515, the depicted process 500 further includes appending a node identifier to the timestamp to create a node time signature for the client event. In the depicted embodiment, the timestamp is generated, and the node identifier is appended by node time signature generating circuitry of the receiving node.

At Block 517, the depicted process 500 further includes comparing the node time signature to a node time signature repository to select a client event write operation. In one embodiment, node time signature generating circuitry of the client event receiving node is configured to compare a newly created node time signature to other node time signatures for a particular client event that might be stored to its memory (i.e., its node time signature repository) to determine which is appropriate for storing or passing along for a client event write operation.

At Block 520, the depicted process 500 further includes updating a client event database based on the client event write operation. The depicted process 500 may conclude at Block 520.

FIG. 5B is an example signal diagram illustrating data flow operations for assigning a timestamp to a client event received to a node within the at least one node group, appending a node identifier to the timestamp to create a node time signature for the client event, comparing the node time signature to a node time signature repository to define a client event write operation, and updating a client event database based on the client event write operation according to embodiments of the present disclosure. FIG. 5B is a signal diagram of example data flows represented by process 500.

FIG. 5B illustrates data flow interactions between example components of the database platform 100 of FIG. 1. For example, the depicted data flow operations occur between node 104A-01 of the node group 104A of regional network 102A, network timing service 106A, and client event database 110.

In the depicted embodiment, Region A network timing service 106A pushes clock calibration data at operation 504 to node 104A-01 to calibrate a device clock and/or node time signature generation circuitry of node 104A-01 as will be apparent to one of ordinary skill in the art. Such calibration data may be pushed by network timing service 106A at regular intervals in various embodiments discussed herein.

In the depicted embodiment, at some point after operation 504 node 104A-01 receives a client event. Such client event was generated, for example, when admin user, Mary, attempted to authorize new employee, Sara M. Johnson ("Sara"), for accessing a content collaboration software (e.g., Confluence® by Atlassian, Inc.). Node 104A-01 (i.e., the node time signature generating circuitry of node 104A-01) determines and assigns a timestamp at operation 505 to the received client event and saves such timestamp association to its local memory. In the depicted embodiment, node 104A-01 issues a timestamp of 1234567 that is assigned to the received authorization event for Sara.

Subsequently, at operation 515, node 104A-01 (i.e., the node time signature generating circuitry of node 104A-01) appends its node identifier to the received timestamp thereby creating a node time signature for the client event. For example, node 104A-01 is configured to append the node identifier "01" to the received timestamp to create a node time signature of 123456701.

At operation 517, node 104A-01 (i.e., the node time signature generating circuitry of node 104A-01) compares the newly generated node time signature (i.e., 123456701) to a node time signature repository to determine a client event write operation. For example, as discussed in greater detail below, node 104A-01 is configured to use the newly generated node time signature to determine appropriate sequencing among client events stored to its node time signature repository for a subsequent client event database write operation.

At operation 520, node 104A-01 updates client event database 110 based on the determined client event write operation.

FIG. 6A is a flowchart illustrating example operations for assigning a second timestamp to a second client event received from a second node within the at least one node group, appending a second node identifier to the second timestamp to create a second node time signature for the second client event, comparing the second node time signature to the node time signature repository to define an updated client event write operation, and updating the client event database based on the updated client event write operation according to embodiments of the present disclosure. As will be appreciated by one of ordinary skill in the art in view of this disclosure, the operations described below occur in the context of various client devices generating one or more client events. Returning to the example discussed at the Overview above, example client events might be the first authorization and duplicate second authorization events issued by admin user Mary regarding provisioning Confluence® access for new user Sara. In another embodiment, example client events may be duplicate authorization events issued for new user Sara by a credential management service.

In the embodiment illustrated in FIG. 6A, the depicted process 600 begins at Block 605, which includes assigning a second timestamp to a second client event (i.e., Mary's duplicate authorization event) received at a second node within the at least one node group. In one embodiment, the second timestamp is generated and assigned to the second client event by node time signature generating circuitry of the receiving node.

At Block 615, the depicted process 600 further includes appending a second node identifier to the second timestamp to create a second node time signature for the second client event. In the depicted embodiment, the second timestamp is generated and appended by node time signature generating circuitry of the receiving node.

At Block 617, the depicted process 600 further includes comparing the second node time signature to the node time signature repository to determine an updated client event write operation. This step includes, in one embodiment, comparing the second timestamp for the second client event to a first timestamp for a first client event (which is drawn from the node time signature repository) and, in circumstances where the first timestamp and the second timestamp are perceived to occur substantially simultaneously, causing the updated client event write operation to order the first client event and the second client event based on comparing the node time signature and the second node time signature. In other embodiments, this step simply involves comparing the second node time signature to a last event node time signature that is stored to the node time signature repository and determining the updated client event write operation based on the comparison.

In the depicted embodiment, at Block 619, the depicted process 600 further includes transmitting or "gossiping" the second node time signature to other nodes (e.g., nodes 104A of Group A) within the at least one node group.

At Block 620, the depicted process 600 further includes updating the client event database based on the updated client event write operation.

FIG. 6B is an example signal diagram illustrating data flow interactions for assigning a second timestamp to a second client event received from a second node within the at least one node group, appending a second node identifier to the second timestamp to create a second node time signature for the second client event, comparing the second node time signature to the node time signature repository to define an updated client event write operation, and updating the client event database based on the updated client event write operation according to embodiments of the present disclosure. FIG. 6B is a signal diagram of example data flows represented by process 600.

FIG. 6B illustrates data flow interactions between example components of the database platform 100 of FIG. 1. For example, the depicted data flow operations occur between nodes 104A-01, 104A-15 of the node group 104A of regional network 102A, network timing service 106A, and client event database 110.

In the depicted embodiment, Region A network timing service 106A pushes clock calibration data at operations 603, 604 to nodes 104A-01 and 104A-15 to calibrate device clocks and/or node time signature generation circuitries of each node as will be apparent to one of ordinary skill in the art. Such calibration data may be pushed by network timing service 106A at regular intervals in various embodiments discussed herein. In alternate embodiments, nodes may issue requests to Region A timing service 106A to trigger calibration data transmissions.

In the depicted embodiment, at some point after operations 603, 604, node 104A-15 receives a client event. Such client event was generated, for example, when admin user, Mary, attempted to authorize new employee, Sara M. Johnson ("Sara"), for accessing a content collaboration software (e.g., Confluence® by Atlassian, Inc.). Node 104A-15 (i.e., the node time signature generating circuitry of node 104A-15) determines and assigns a timestamp at operation 605 to the received client event and saves such timestamp association to its local memory. In the depicted embodiment, node 104A-15 issues a timestamp of 1234567 that is assigned to the received authorization event for Sara.

At operation 615, node 104A-15 (i.e., the node time signature generating circuitry of node 104A-15) appends its node identifier to the second timestamp to create a second node time signature for the second client event. For example, node identifier "15" is appended to the second timestamp to create a second node time signature of 123456715 because node 104A-15 received the second client event.

At operation 617, node 104A-15 (i.e., the node time signature generating circuitry of node 104A-15) compares the newly generated second node time signature (i.e., 123456715) to a node time signature repository to determine a client event write operation. For example, node 104A-15 is configured to use the newly generated second node time signature to determine appropriate sequencing among client events stored to its node time signature repository for a subsequent client event database write operation.

In one example, a node time signature repository that is local to or accessible by node 104A-15 includes a stored node time signature associated with Mary's first authorization event (e.g., 123456701) by virtue of a gossip protocol occurring between node 104A-01 and node 104A-15. The node time generating circuitry of node 104A-15 is configured to compare the second node time signature (e.g., 123456715) associated with Mary's second authorization event to the node time signature (e.g., 123456701) associated with Mary's first authorization event and determine that the second node time signature has a greater magnitude (i.e., 123456715 is greater than 123456701). Accordingly, in this embodiment, the node time generating circuitry of node 104A-15 determines that the second client event is appropriate for a later client event write operation (e.g., referred to herein as an updated client event write operation) and the first client event may be discarded or deprioritized.

While the above example refers to the second node time signature as greater than the node time signature associated with Mary's first authorization event, one of ordinary skill in the art will readily appreciate that the inventive concepts described herein may also be applied in circumstances where time stamps are issued on a negative scale. In such circumstances, the node time generating circuitry of node 104A-15 may be configured to compare the second node time signature (e.g., −123456715) associated with Mary's second authorization event to the node time signature (e.g., −123456701) associated with Mary's first authorization event and determine that the second node time signature is more negative (i.e., −123456715 has a greater magnitude on a negative scale than −123456701). In this embodiment, the node time generating circuitry of node 104A-15 determines that the second client event is appropriate for a later client event write operation (e.g., referred to herein as an updated client event write operation) and the first client event may be discarded or deprioritized. The term "greater magnitude" as used herein refers to values that are larger on a positive time stamp scale or more negative on a negative time stamp scale.

At optional operation 619, node 104A-15 (i.e., the client event replication circuitry of node 104A-15) gossips or transmits the second node time signature within the at least one node group. In the depicted embodiment, the second node time signature is gossiped to node 104A-01. However, as will be apparent to one of ordinary skill in the art, the second node time signature may be gossiped to others or all of node groups 104A, 104B.

In one embodiment, the gossip protocol results in an exchange of state information between nodes 104A-01 and 104A-15. In other embodiments, the gossip protocol further includes storage of the second note time signature in a node time signature repository that is local to or accessible by node 104A-01.

At operation 620, node 104A-15 updates the client event database based on the updated client event write operation. In one embodiment, this step involves writing only Mary's second authorization event to the client event database as it was determined to occur last at the comparison step of operation 617. In another embodiment, both of Mary's first and second authorization events are written to the client event database with Mary's first authorization event written first and Mary's second authorization event written second as such sequence was determined by the comparison step of operation 617.

FIG. 7 is a flowchart illustrating example operations for receiving a client event from a node within the at least one node group, identifying a client event operational order for the client event, assigning a node time signature for the client event based at least in part on the client event operational order, comparing the node time signature to a node time signature repository to select a client event write operation; and updating a client event database based on the client event write operation according to embodiments of the present disclosure. As will be appreciated by one of ordinary skill in the art in view of this disclosure, the operations described below occur in the context of various client devices generating one or more client events. Returning to the example discussed at the Overview above, example client events might be admin user Mary's second authorization event and admin user Henry's revocation event regarding provisioning Confluence® access for new user Sara.

In the embodiment illustrated in FIG. 7, the depicted process 700 begins at Block 705, which includes receiving a client event (i.e., Henry's revocation event) from a node within the at least one node group.

At Block 710, the depicted process 700 further includes identifying a client event operational order for the client event. In one embodiment, node time signature generating circuitry of a receiving node is configured to identify a client event operational order from a client event operation order set that is stored to its local memory. The client event operational order may be selected from the client event operational order set based on a client event type that is associated with the received client event. For example, returning to Henry's revocation event, the node time signature generating circuitry is configured to determine a client event type of "access event" associated with Henry's revocation event and to select an access event operational order from the stored client event operational order set based on the determined "access event" client event type. In the depicted embodiment, the client event type is identified from metadata associated with the received client event (e.g., Henry's revocation event). The access event operational order provides a set of rules or policies indicating that revocation events must occur after authorization events.

In still another embodiment, a received client event may include an associated token that directs a receiving node (i.e., node time generating circuitry of a receiving node) to a last event node time signature for a preceding event. Such token is assigned to the client event by its issuing client device. In some embodiments, a token is a hashed address value configured to direct a receiving node to a data center memory location where a last event node time signature is stored. For example, in one embodiment, a token may direct the receiving node to a last event node time signature stored to a local node time signature repository. In other embodiments, a token may direct the receiving node to a last event node time signature stored to memory of another node in the node group, a memory location in the client event database, or some other memory device location.

Receiving nodes structured in accordance with various embodiments discussed herein are configured to identify a client event operational order from a client event operation order set based on a last event node time signature that is associated with the received client event. In some embodiments, the last event node time signature may be used to determine a client event type, which is then used to determine a client event operational order. However, in other embodiments, a last event node time signature may be used directly to determine a client event operational order.

At Block 715, the depicted process 700 further includes assigning a node time signature for the client event based at least in part on the client event operational order. As discussed in detail above, in various embodiments, assigning a node time signature comprises assigning a timestamp to the client event and appending a node identifier to the timestamp to create a node time signature. The operation at Block 715 enhances this process by assigning the node time signature based at least in part upon reference to a client device operational order.

Returning to the example of Henry's revocation event, the node time signature generating circuitry is configured to consider and potentially update a node time signature for such revocation event in view of the access event operational order. In circumstances where a receiving node is directed to a last event node time signature for a prior authorization event (e.g., by a token issued by a client device to accompany a client event), the node time signature generating circuitry of the receiving node is configured to modify any timestamp to ensure that the newly received revocation event is given a node time signature that sequences the revocation event to occur after the prior authorization event (i.e., the client event associated with the last event node time signature) in an eventual client event write operation consistent with the access event operational order. For example, if the last event node time signature for a prior authorization event were 123456715 and a receiving node device clock generates a timestamp for Henry's revocation event of 1234567, the node time signature generating circuitry of the receiving node (e.g., node 104A-05) is configured to modify the generated timestamp to U.S. Pat. No. 1,234,568 to ensure that Henry's revocation event is given a node time signature of 123456805 thereby sequencing the revocation event to occur after the prior authorization event in an eventual client event write operation consistent with the access event operational order.

At Block 720, the depicted process 700 further includes comparing the node time signature to a node time signature repository to select a client event write operation. In one embodiment, a node time signature repository is local or otherwise accessible to the node initiating comparison of the node time signature and node time signature repository. In other embodiments, such comparison is facilitated via gossip protocol between two or more nodes within the at least one node group.

At Block 725, the depicted process 700 further includes updating a client event database based on the client event write operation. The depicted process 700 may conclude after Block 725.

FIG. 8 is a flowchart illustrating example operations for receiving a last event node time signature associated with a last client event that is associated with the client event by the client event operational order, comparing the last event node time signature to the node time signature, and in circumstances where the last event node time signature has a greater magnitude than the node time signature, modifying the node time signature to create an updated node time signature that exceeds the last event node time signature, comparing the updated node time signature to the node time signature repository to select the client event write operation, and updating the client event database based on the client event write operation according to embodiments of the present disclosure. As will be appreciated by one of ordinary skill in the art in view of this disclosure, the operations described below occur in the context of various client devices generating one or more client events. Returning to the example discussed at the Overview above, example client events might be admin user Mary's second authorization event and admin user Henry's revocation event regarding provisioning Confluence® access for new user Sara.

In the embodiment illustrated in FIG. 8, the depicted process 800 begins at Block 805, which includes retrieving a last event node time signature associated with a last client event that is identified, in some embodiments, based on a token received in association with a newly received client event. The last client event may be used to indirectly (e.g., through determination of a client event type) or directly identify a client event operational order from a client event operational order set as discussed above.

In one embodiment, a last event node time signature is retrieved from a node time signature repository that is local or otherwise accessible by a node within the at least one node group. In other embodiments, a last event node time signature may be stored to memory of another node in the node group, a memory location in the client event database, or some other memory device location.

In the above referenced example involving Henry's revocation event, the most recent client event that is associated with Sara was Mary's second authorization event (assigned a node time signature of 123456715). Therefore, as to Henry's revocation event, Mary's second authorization event is designated as a last client event. Mary's second authorization event has a node time signature of 123456715.

At Block 810, the depicted process 800 further includes comparing the last event node time signature to the newly received node time signature. Henry's revocation event was assigned a node time signature of 123456705 due to a received timestamp of 1234567 and a receiving node identifier of 05. In the depicted embodiment, receiving node 104A-05 received a token issued by Henry's client device in association with the revocation event that pointed the receiving node to Mary's second authorization event and its associated last event node time signature.

At Block 815, the depicted process 800 further includes, in circumstances where the last event node time signature has a greater magnitude than the newly received node time signature, modifying the node time signature to create an updated node time signature that exceeds the last event node time signature. In our example, node time signature generating circuitry of the receiving node is configured to determine that the last event node time signature associated with Sara's authorization event has a greater magnitude than Henry's recently assigned node time signature (i.e., 123456715>123456705). This suggests a possible error or issue associated with clock skew as a newly received revocation event should not occur before a last event that was an authorization event based on rules or policies set forth by the relevant client event operational order. Said differently, the client event operational order for such access events dictates that Henry's revocation of Sara's Confluence access should not come before such access was granted. Thus, node time signature generating circuitry of the receiving node (e.g., node 104A-05 of FIG. 1) is configured to update the node time signature associated with Henry's revocation event so that it logically and sequentially occurs after Mary's second authorization event. In our example, this means that the node time signature generating circuitry generates an updated node time signature of 123456805 for Henry's revocation event.

At Block 820, the depicted process 800 further includes comparing the updated node time signature to the node time signature repository to select the client event write operation. In other words, the receiving node that generated the updated node time signature for Henry's revocation event is configured to compare the updated node time signature to its node time signature repository and make any updates that are required in order to determine a corresponding client event write operation. In the current example, this might mean ensuring that the node time signature repository is updated to reflect that Henry's revocation event occurs after Mary's authorization event in any eventual client event database write operation.

At Block 825, the depicted process 800 further includes updating a client event database based on the client event write operation.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computer-implemented method for sequencing client events in a network comprised of at least one node group, the computer-implemented method comprising:

assigning a timestamp to a client event received at a node within the at least one node group;
appending a node identifier to the timestamp to create a node time signature for the client event;
comparing the node time signature to a node time signature repository to define a client event write operation; and
updating a client event database based on the client event write operation.

2. The computer-implemented method of claim 1, further comprising:
assigning a second timestamp to a second client event received from a second node within the at least one node group;
appending a second node identifier to the second timestamp to create a second node time signature for the second client event;
comparing the second node time signature to the node time signature repository to define an updated client event write operation; and
updating the client event database based on the updated client event write operation.

3. The computer-implemented method of claim 2, further comprising:
in circumstances where the timestamp and the second timestamp are perceived by the network to occur substantially simultaneously, cause the updated client event write operation to order the client event and the second client event based on comparing the node time signature and the second node time signature.

4. The computer-implemented method of claim 1, wherein the client event is an authorization event.

5. The computer-implemented method of claim 1, wherein the client event is a revocation event.

6. A computer-implemented method for sequencing client events in a network comprised of at least one node group, the computer-implemented method comprising:
receiving a client event to a node within the at least one node group;
identifying a client event operational order for the client event;
assigning a node time signature for the client event based at least in part on the client event operational order;
comparing the node time signature to a node time signature repository to define a client event write operation; and
updating a client event database based on the client event write operation.

7. The computer-implemented method of claim 6, further comprising:
receiving a last event node time signature associated with a last client event that is associated with the client event by the client event operational order;
comparing the last event node time signature to the node time signature; and
in circumstances where the last event node time signature has a greater magnitude than the node time signature, modify the node time signature to create an updated node time signature that exceeds the last event node time signature;
comparing the updated node time signature to the node time signature repository to define the client event write operation; and
updating the client event database based on the client event write operation.

8. The computer-implemented method of claim 6, wherein assigning the node time signature for the client event comprises assigning a timestamp to the client event and appending a node identifier to the timestamp to create the node time signature.

9. The computer-implemented method of claim 8, further comprising:
assigning a second timestamp to a second client event received to a second node within the at least one node group;
appending a second node identifier to the second timestamp to create a second node time signature for the second client event;
comparing the second node time signature to the node time signature repository to define an updated client event write operation; and
updating the client event database based on the updated client event write operation.

10. The computer-implemented method of claim 9, further comprising:
in circumstances where the timestamp and the second timestamp are perceived by the network to occur substantially simultaneously, cause the updated client event write operation to order the client event and the second client event based on comparing the node time signature and the second node time signature.

11. The computer-implemented method of claim 6, wherein the client event is an authorization event.

12. The computer-implemented method of claim 6, wherein the client event is a revocation event.

13. An apparatus configured for sequencing client events in a network comprised of at least one node group, the apparatus comprising at least one processor and at least one memory, the at least one memory having computer-coded instructions therein, wherein the computer-coded instructions are configured to, in execution with the at least one processor, cause the apparatus to:
assign a timestamp to a client event received to a node within the at least one node group;
append a node identifier to the timestamp to create a node time signature for the client event;
compare the node time signature to a node time signature repository to define a client event write operation; and
update a client event database based on the client event write operation.

14. The apparatus of claim 13, wherein the computer-coded instructions are further configured to cause the apparatus to:
assign a second timestamp to a second client event received to a second node within the at least one node group;
append a second node identifier to the second timestamp to create a second node time signature for the second client event;
compare the second node time signature to the node time signature repository to define an updated client event write operation; and
update the client event database based on the updated client event write operation.

15. The apparatus of claim 14, wherein the computer-coded instructions are further configured to cause the apparatus to:
in circumstances where the timestamp and the second timestamp are perceived by the network to occur substantially simultaneously, cause the updated client event write operation to order the client event and the second client event based on comparing the node time signature and the second node time signature.

16. The apparatus of claim 13, wherein the client event is an authorization event or a revocation event.

17. An apparatus configured for sequencing client events in a network comprised of at least one node group, the apparatus comprising at least one processor and at least one memory, the at least one memory having computer-coded instructions therein, wherein the computer-coded instructions are configured to, in execution with the at least one processor, cause the communication apparatus to:
receive a client event;
identify a client event operational order for the client event;
assign a node time signature for the client event based at least in part on the client event operational order;
compare the node time signature to a node time signature repository to define a client event write operation; and
update a client event database based on the client event write operation.

18. The apparatus of claim 17, wherein the computer-coded instructions are further configured to cause the apparatus to:
receive a last event node time signature associated with a last client event that is associated with the client event by the client event operational order;
compare the last event node time signature to the node time signature; and
in circumstances where the last event node time signature has a greater magnitude than the node time signature, modify the node time signature to create an updated node time signature that exceeds the last event node time signature;
compare the updated node time signature to the node time signature repository to define the client event write operation; and
updating the client event database based on the client event write operation.

19. The apparatus of claim 18, wherein the last event node time signature is retrieved based on a token associated with the client event.

20. The apparatus of claim 17, wherein assigning a node time signature for the client event comprises assigning a timestamp to the client event and appending a node identifier to the timestamp that is associated with a node that received the client event to create the node time signature.

21. The apparatus of claim 20, wherein the computer-coded instructions are further configured to cause the apparatus to:
receive a second node time signature associated with a second client event;
compare the second node time signature to the node time signature repository to define an updated client event write operation; and
update the client event database based on the updated client event write operation.

22. The apparatus of claim 17, wherein the client event is an authorization event or a revocation event.

23. The apparatus of claim 21, wherein the second node time signature comprises a second timestamp and a second node identifier associated with a second node that received the second client event, and wherein the computer-coded instructions are further configured to cause the apparatus to:
in circumstances where the timestamp and the second timestamp are perceived by the network to occur substantially simultaneously, cause the updated client event write operation to order the client event and the second client event based on comparing the node time signature and the second node time signature.

* * * * *